July 5, 1949.  W. H. CASTAY  2,475,351
FILM SPLICER

Filed April 29, 1946  3 Sheets-Sheet 1

Inventor:
WALTER H. CASTAY
John H. Ruckman
BY
Attorney:

July 5, 1949. W. H. CASTAY 2,475,351
FILM SPLICER
Filed April 29, 1946 3 Sheets-Sheet 2

Inventor:
WALTER H. CASTAY
BY John H. Ruckman
Attorney

July 5, 1949.  W. H. CASTAY  2,475,351
FILM SPLICER

Filed April 29, 1946  3 Sheets-Sheet 3

Inventor:
WALTER H. CASTAY
John H. Ruckman
By Attorney:

Patented July 5, 1949

2,475,351

UNITED STATES PATENT OFFICE 2,475,351

FILM SPLICER

Walter H. Castay, New Orleans, La.

Application April 29, 1946, Serial No. 665,845

6 Claims. (Cl. 154—42.1)

My invention relates to film splicers and is intended more particularly for use in splicing motion picture films. However, it may be used for splicing other kinds of films such as those used for carrying sound records without pictures and films adapted for transmission purposes.

Among the objects of the invention is the provision of a device by means of which a strong butt splice may be quickly and easily made without requiring any scraping of emulsion from the film. Another object is to provide for making an accurately aligned splice in a darkened projection room. Another object is to provide a device in which the butted ends of two film sections can be spliced without the loss of a single frame provided that the film ends have not been torn or damaged. Another object is to provide a built in cement holder so that cement for the splice is always at hand.

The novel features which I believe to be characteristic of this invention are set forth with particularity in the appended claims. The invention itself, however, both as to organization and method of operation, together with additional objects and advantages thereof, will be best understood from the following description of a specific embodiment when read in connection with the accompanying drawings in which, Fig. 1 is an isometric view of the device.

Figure 3:
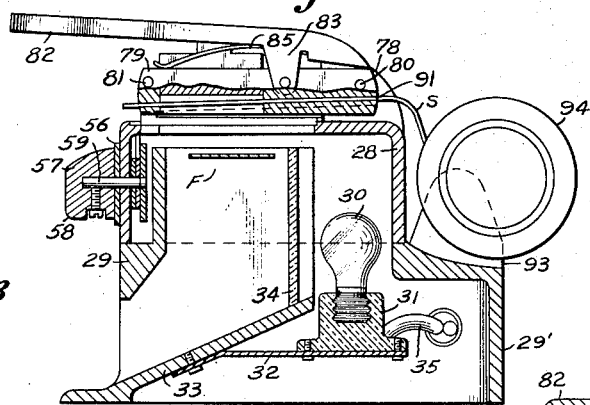
Fig. 3 is a view in vertical cross section.
Figures 4, 6, 11:
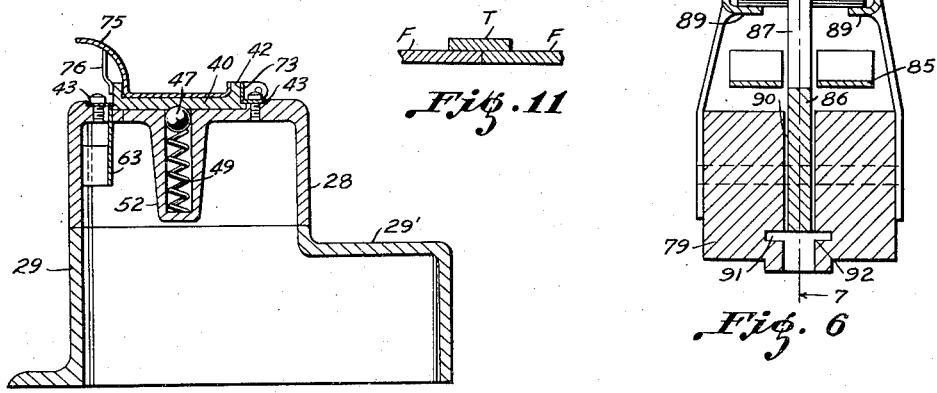
Fig. 4 is another view in vertical cross section.
Fig. 6 is a sectional view of a plunger device.
Fig. 11 is a sectional view showing a splicing piece applied to butted film ends.

Referring to the construction shown in the drawings for the purpose of illustrating the principles involved in this invention, the numeral 28 designates an upper casing member and the numeral 29 designates a lower casing member, these two parts of the casing being secured together in suitable manner. The member 29 has a rear extension 29' as shown in Fig. 4. As shown in Fig. 3, the casing member 29 contains an electric light bulb 30 adapted to be inserted in a socket 31 carried by a plate 32 attached to the underside of the inclined bottom 33 of a chute 34 which may be conveniently cast together with the member 29. The socket 31 has a connection 35 leading from a switch 36 shown in Fig. 1.

Figure 8:
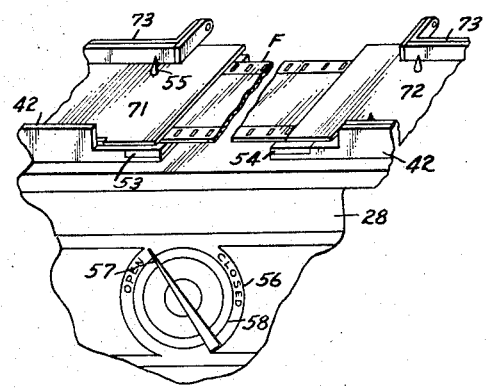
Fig. 8 is a detail view showing two ends of film in position for trimming when the carriage mechanism is in open position.
Figure 9:
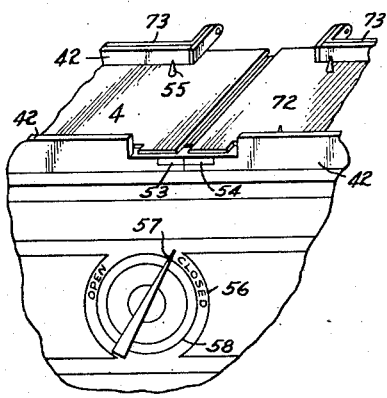
Fig. 9 is a detail view showing the carriage mechanism in closed position for making a splice.
Figure 2:
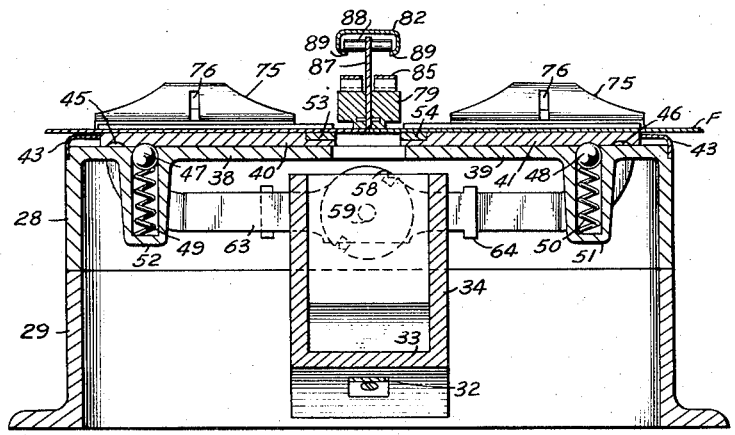
Fig. 2 is a view in vertical longitudinal section.

As best shown in Fig. 2, the casing member 28 is cast with two horizontal top members 38 and 39, which are spaced from each other at the center to provide a central opening and which provide supports upon which film carriers 40 and 41 respectively are adapted to slide. These carriers have upstanding side flanges 42 as will be understood from Fig. 5, the two flanges for each carrier being spaced from each other by the width of the film which is to be spliced. The carriers fit between trackways upon which spaced strips 43 are secured as by means of screws. The strips 43 extend over side flanges of the carriers and hold the carriers in place for back and forth sliding movement, and are provided with stop projections 44 which determine the extent of backward movement of the carriers. The bottoms of the carriers as shown in Fig. 2 are provided with pairs of rounded indentations 45 and 46 adapted to receive balls 47 and 48 respectively which are held upwardly by springs 49 and 50 contained in pockets 51 and 52 extending down from the top members 38 and 39. When the balls are in the outer indentations, the carriers are held in position adjacent each other as shown in Fig. 9, and when the balls are in the inner indentations, the carriers are held spaced from each other by the length of one frame of picture film as shown in Fig. 8.

Figure 5:
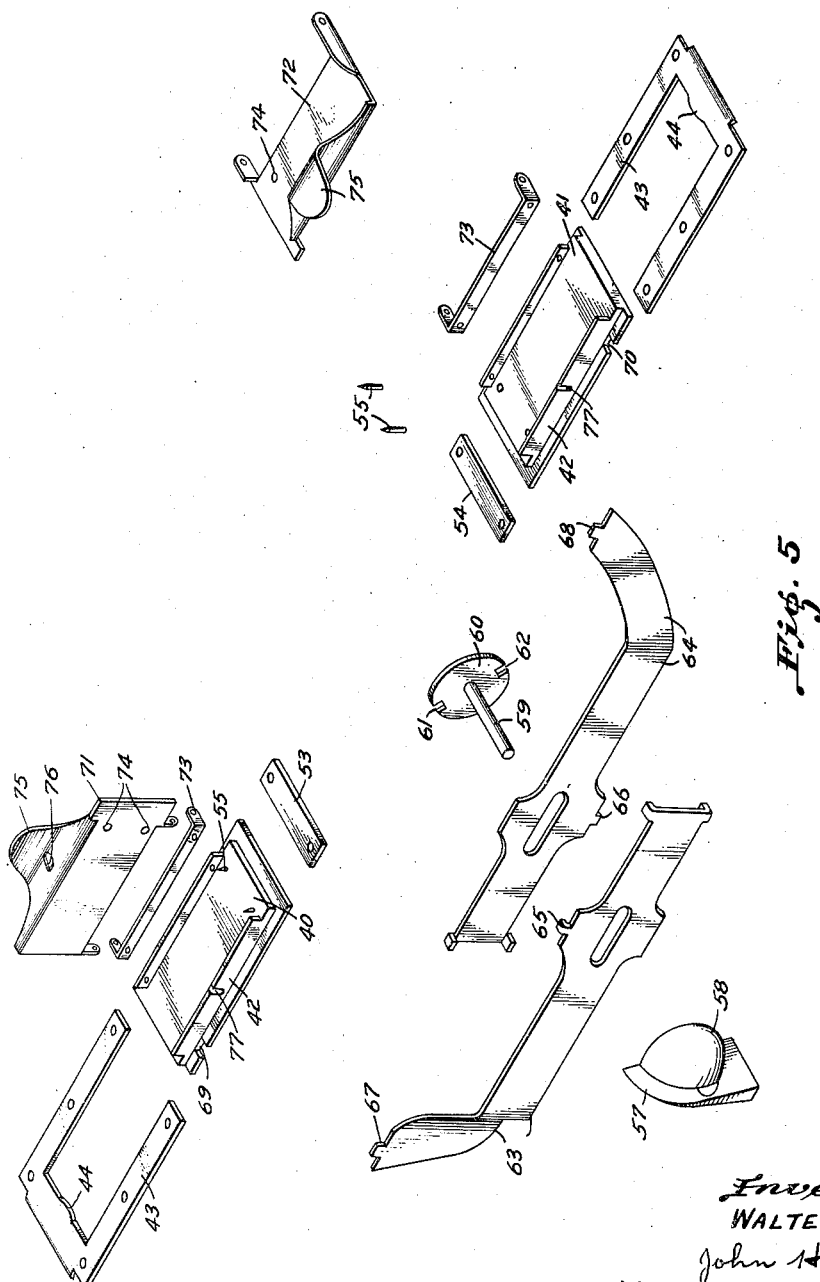
Fig. 5 is an exploded view of a carriage mechanism.

The inner ends of the film carriers are provided with cutting or trimming dies 53 and 54 which are set therein as best shown in Fig. 2 and may be held by screws. Back of the dies, the film carriers are provided with pairs of upstanding pins 55 as shown in Figs. 5 and 8. The pins 55 when the film is placed properly thereover cause the trimmed ends of film to be brought into butted position when the carriers are moved into their closed position.

In order to slide the carriers back and forth into open and closed position, the front of the casing is provided with a dial 56 indicating open and closed position of the carriers. A pointer 57 is carried by a knob 58, the lower portion of the pointer being enlarged for grasping. The knob is secured to the outer end of a rod 59 passing centrally through the dial. Secured to the inner end of the rod, there is a disk 60 having diametrically opposite notches 61 and 62 in its periphery. The rod 59 passes through slots in overlapping operating arms 63 and 64 which have lugs 65 and 66 for fitting into the notches 61 and 62 respectively as will be best understood from Fig. 5. The outer angular ends of the arms 63 and 64 pass through slots in the supports 38—39 and carry lugs 67 and 68 for fitting into notches 69 and 70 in the front sides of the film carriers.

Clamping lids 71 and 72 are hinged to angle strips 73 secured to the rear flanges of the carriers respectively. These lids are provided with holes 74 for receiving the pins 55 when the lids are turned down. The front of the lids are provided with upwardly turned handles 75 below which the material is struck out to form tongues 76 adapted to snap into grooves 77 in the front flanges 42 in order that the film may be clamped flat upon the carriers.

Two spaced lugs 78 extend up from the top of the casing at the rear thereof. The rear end of a trimming punch 79 is pivotally supported by these lugs on a pivot 80 which is higher up than the dies 53 and 54. It is obvious that the punch will coact with the dies with a shearing action as will be understood from the dotted line D in Fig. 7. The punch is made in two parts which are held together at the front by a rivet 81.

Figure 7:
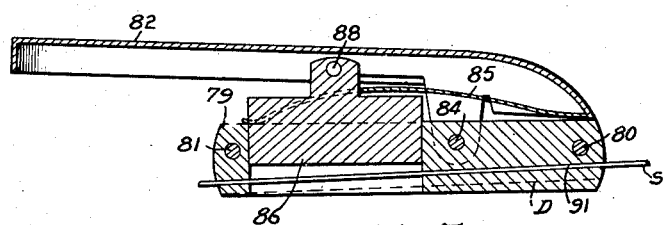
Fig. 7 is a view in section on the line 7—7 of Fig. 6.
Figure 10:
Fig. 10 is a view showing a portion of splicing strip after a splicing piece has been punched out.

A hand operated lever 82 has a pair of downward projections 83 which are connected with the punch by a pivot 84 as best shown in Figs. 3 and 7. This lever is normally held from the punch by a leaf spring 85 interposed between the lever and the punch, but when the lever is depressed, the punch will also be depressed sufficiently for co-action with the dies 53 and 54 when the film carriers are in open position. As will be understood from Fig. 7, an auxiliary punch 86 has an upstanding ear 87 which is mounted on a pivot pin 88 held in the handle 82 by flanges 89 as best shown in Figs. 2 and 6. The punch 86 passes between bifurcations of the spring 85, then through a vertical slot 90 in the main punch 79, then through a horizontal slot 91, and finally through a die member 92 on the bottom of the trimming punch 79. As will be understood from Figs. 1 and 7, the slot 91 extends all the way through the punch 79 for a purpose which will now be made clear.

Figure 1:
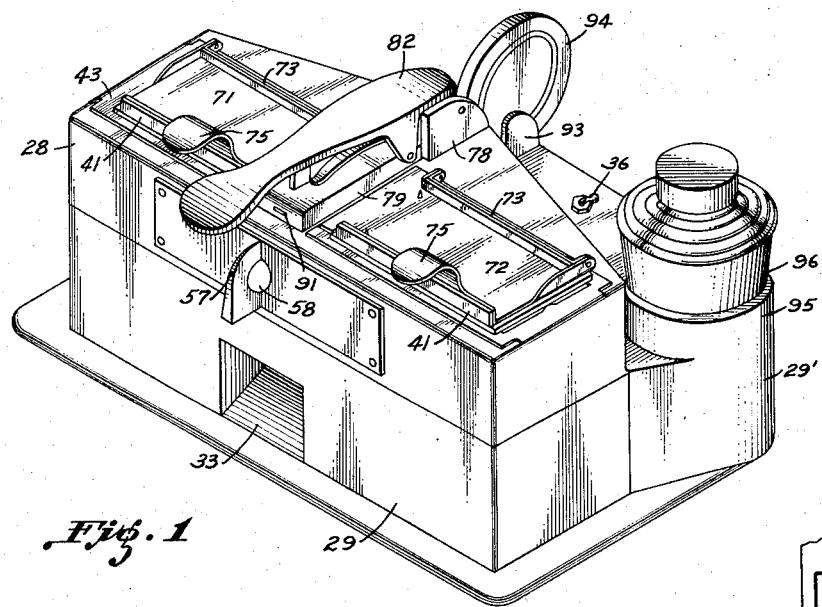

As best shown in Figs. 1 and 3 two spaced lugs 93 extend up from the rear casing extension 29' for attachment of a housing 94 which constitutes a magazine for a roll of untreated splicing strip S. This strip in use is pulled all the way through the horizontal slot 91 in the main punch 79 and out from the front thereof as will be best understood from Fig. 1. As will be understood from Fig. 6, the splicing strip while in the slot 91 is located directly above the auxiliary die 92 and in position to be acted upon by the auxiliary punch 86 when the latter is fully depressed. As shown in Fig. 1, the casing extension 29' is provided with an upstanding socket 95 for holding a capped bottle 96 containing quick drying cement.

The operation and advantages of my invention will be obvious in connection with the foregoing description and the accompanying drawings and are summarized in the following manner. The knob 58 is turned to indicate open position of the film carriers 40—41 and their attached cutting dies 53—54, and the switch 36 is closed to turn on the light bulb 30. The clamping lids 71—72 are raised and the two parts of the film F to be spliced are placed on the carriers with the emulsion side down and the frame lines on the edges of the dies. The lids are then closed and the ends of film pushed down in the chute 34 if necessary. The trimming punch 79 is brought down to trim the ends of the film. This punch is allowed to return to up position and the knob 58 is turned to indicate closed position of the film carriers. The splicing strip S is pulled through the horizontal slot 91 until the cut out of a previous splice is clear of the punch 79. Cement is then applied to the butted ends of film through the gap between the lids 71—72 shown in Fig. 9. These lids prevent the cement from spreading beyond their edges and thus keep the cement from smearing the film beyond the splice. The auxiliary punch 86 is immediately brought down to extreme position by applying firm pressure on the handle 82 thereby punching a splicing piece T out of the strip S and applying it to the butted ends of the film as indicated in Fig. 11. This pressure needs to be kept on only a very short time to allow the cement to set as the lamp helps to dry it. The punch 86 is then returned to up position, the clamping lids raised and the completed splice removed so that the device is quickly ready for another splicing operation. It is to be further noted that the trimmed off ends of picture film drop through the chute 34 as will be apparent from Fig. 3.

I claim:

1. In a film splicer, the combination of two carriers for holding film, die members on opposed edges of said carriers, a main punch adapted to co-act with said die members for cutting film with a shearing cut, said punch having a vertical slot, a die member carried by said punch, an auxiliary punch in said slot adapted to co-act with said last mentioned die member, a magazine for holding a splicing strip, said main punch having a horizontal slot above said last mentioned die member for passage of said splicing strip, and means for operating said auxiliary punch for cutting a splicing piece from the splicing strip and holding said auxiliary punch in engagement with said piece placed upon cement coated butted ends of film.

2. In a film splicer, the combination of two carriers for holding film, means for moving said carriers into open and closed position with relation to each other, clamping lids hinged to said carriers, a main punch and die device adapted to trim the ends of film extending from opposite ends of said carriers when the carriers are in open position, an auxiliary punch and die device carried by said main device and adapted to punch a splicing piece from a splicing strip when said carriers are in closed position, and means for holding said auxiliary punch in engagement with said piece placed upon cement coated butted ends of film.

3. In a film splicer, the combination of a casing, two carriers slidably mounted in said casing for holding film, a dial on said casing for indicating open and closed position of said carriers, a pointer cooperating with said dial, connections between said pointer and said dial, connections between said pointer and said carriers respectively for moving the carriers into open and closed position, clamping lids hinged to said carriers, a punch device carried by said casing for trimming the ends of film extending respectively from opposite ends of said carriers when the carriers are in open position, and a combined punch and pressure applying device carried by said casing for cutting a splicing piece lengthwise from a splicing strip and adhesively securing said piece over butted ends of the trimmed film when said carriers are in closed position.

4. In a film splicer, the combination of a casing, two carriers slidably mounted in said casing for holding film, a dial on said casing for indicating open and closed position of said carriers, a rod passing centrally and rotatably through said dial, a pointer secured to the outer end of said rod for cooperating with said dial, connections between the inner end of said rod and said carrier respectively for moving the carriers into open and closed position, clamping lids hinged to said carriers, die members on the opposed edges of said carriers, a main punch adapted to cooperate with said die members for trimming the ends of film extending from opposite ends of said carriers when the carriers are in open position, said main punch having a vertical slot, a die member carried by said punch around the lower portion of said slot, a combined punch and pressure applying device in said slot adapted to cooperate with said last mentioned die member, a magazine carried by said casing for holding a splicing strip, said main punch having a horizontal slot just above said last mentioned die member for passage of said splicing strip, and operating means for said combined device whereby a splicing piece is cut lengthwise from said splicing strip and adhesively secured over butted ends of the trimmed film when said carriers are in closed position.

5. In a film splicer, the combination of a casing, two carriers slidably mounted in said casing for holding film, die members on opposed edges of said carriers, a device for moving said carriers into open and closed position with relation to each other, clamping lids hinged to said carriers, the opposed edges of said lids being positioned slightly back of said die members to form a gap between said lids when said carriers are in closed position, a main punch adapted to coact with said die members for trimming film with a shearing cut, the rear end of said punch being pivoted to said casing at a place above said dies, an operating handle pivotally connected to said punch, said punch having a vertical slot, a die member carried by said punch around the lower portion of said slot, and a combined punch and pressure applying device working in said slot adapted to cooperate with said last mentioned die member, said main punch having a horizontal slot just above said last mentioned die member for passage of a splicing strip whereby a splicing piece is cut from said strip and adhesively secured over butted ends of the trimmed film by operation of said combined device when said carriers are in closed position.

6. In a film splicer, the combination of a main punch for trimming the ends of two pieces of film, mechanism for bringing the trimmed ends of film into butted engagement with each other, said punch having a vertical slot therein, a die member carried by said punch around the lower portion of said slot, and a combined punch and pressure applying device working in said slot and adapted to cooperate with said die member, said main punch having a horizontal slot therein just above said die member for passage of a splicing strip whereby a splicing piece is cut lengthwise from said strip and adhesively secured over the butted ends of the trimmed film by operation of said combined device.

WALTER H. CASTAY.

REFERENCES CITED

The following references are of record in the file of this patent:

UNITED STATES PATENTS

| Number | Name | Date |
|---|---|---|
| 1,121,765 | Schultze | Dec. 22, 1914 |
| 1,175,449 | Hirsch | Mar. 14, 1916 |
| 1,310,215 | Schneider | July 15, 1919 |
| 1,396,895 | Stolz | Nov. 15, 1921 |
| 1,535,129 | Monacelli et al. | Apr. 28, 1925 |
| 2,250,194 | Gavin | July 22, 1941 |

FOREIGN PATENTS

| Number | Country | Date |
|---|---|---|
| 169,354 | Great Britain | Sept. 29, 1921 |